United States Patent [19]
Murasugi et al.

[11] Patent Number: 5,791,972
[45] Date of Patent: Aug. 11, 1998

[54] POLISHING/GRINDING METHOD

[75] Inventors: Yoshinori Murasugi, Utsunomiya; Akihiko Matoba, Ushiku; Kenji Fujiwara, Utsunomiya; Toru Imanari, Kawasaki, all of Japan

[73] Assignee: Canon Kabushiki Kaisha, Tokyo, Japan

[21] Appl. No.: 288,213

[22] Filed: Aug. 9, 1994

Related U.S. Application Data

[63] Continuation-in-part of Ser. No. 209,372, Mar. 14, 1994, abandoned, which is a continuation of Ser. No. 973,758, Nov. 9, 1992, abandoned.

[30] Foreign Application Priority Data

Nov. 12, 1991 [JP] Japan ................................. 3-323846
Oct. 21, 1992 [JP] Japan ................................. 4-283047

[51] Int. Cl.$^6$ ............................................. B24B 1/00
[52] U.S. Cl. ........................... 451/28; 451/42; 451/50; 451/280; 451/332; 451/333; 451/339
[58] Field of Search ................. 451/28, 41, 42, 451/280, 285, 289, 332, 333, 336, 339, 390

[56] References Cited

U.S. PATENT DOCUMENTS 2,933,863  4/1960  Döll .
4,419,846  12/1983  Schmitzek et al. .
4,829,716  5/1989  Ueda .

FOREIGN PATENT DOCUMENTS 57-127662  8/1982  Japan .
58-71056   4/1983  Japan .
61-157276  7/1986  Japan .
63-17587   4/1988  Japan .

Primary Examiner—Timothy V. Eley
Attorney, Agent, or Firm—Fitzpatrick, Cella, Harper & Scinto

[57] ABSTRACT

A method of working a workpiece with an apparatus comprising the steps of holding the workpiece by a holding means, rotating the held workpiece by a rotational means in a direction of a tool to match a rotational axis line of the workpiece with a rotation axis line of the tool, matching a vertical axis of the holding means holding the workpiece with an intersection of a swingable rotation axis line of a means for swingably rotating the tool and the tool rotation axis line, and holding the workpiece above the tool and the working the workpiece by exerting work pressure on the workpiece.

1 Claim, 6 Drawing Sheets

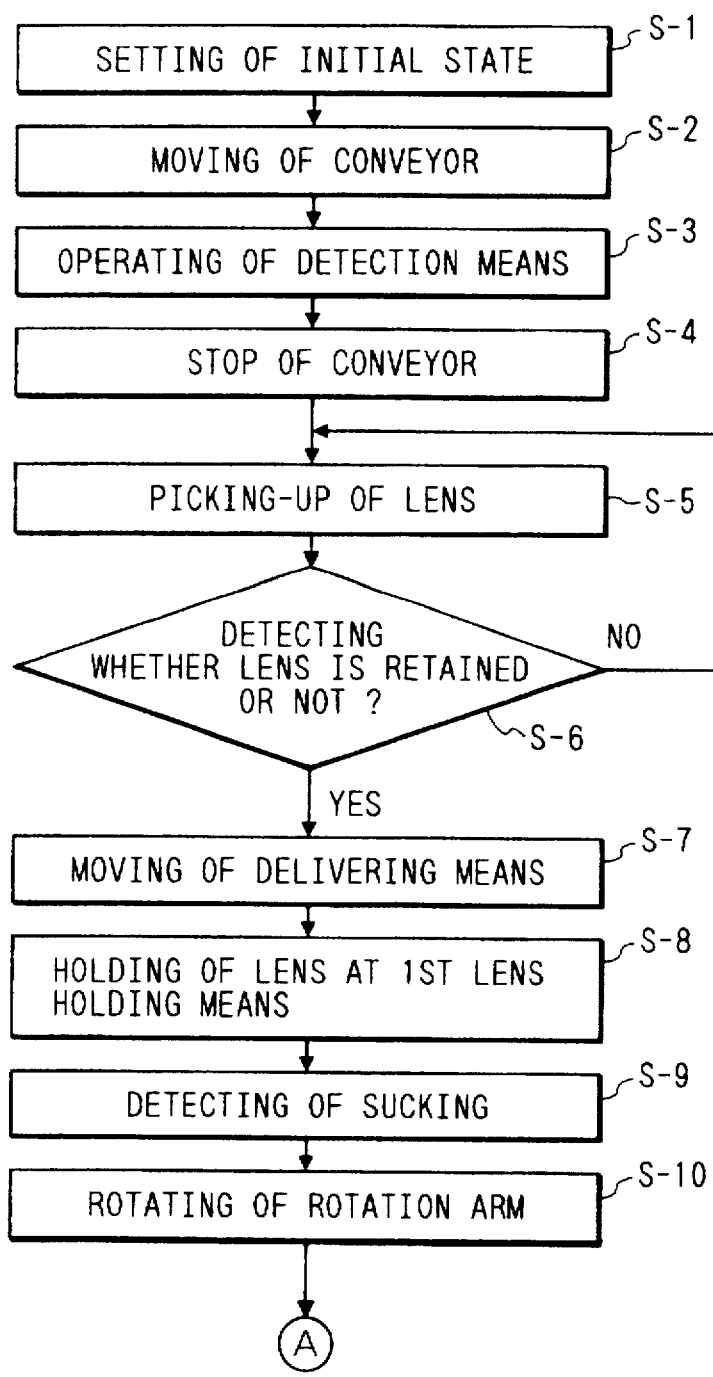

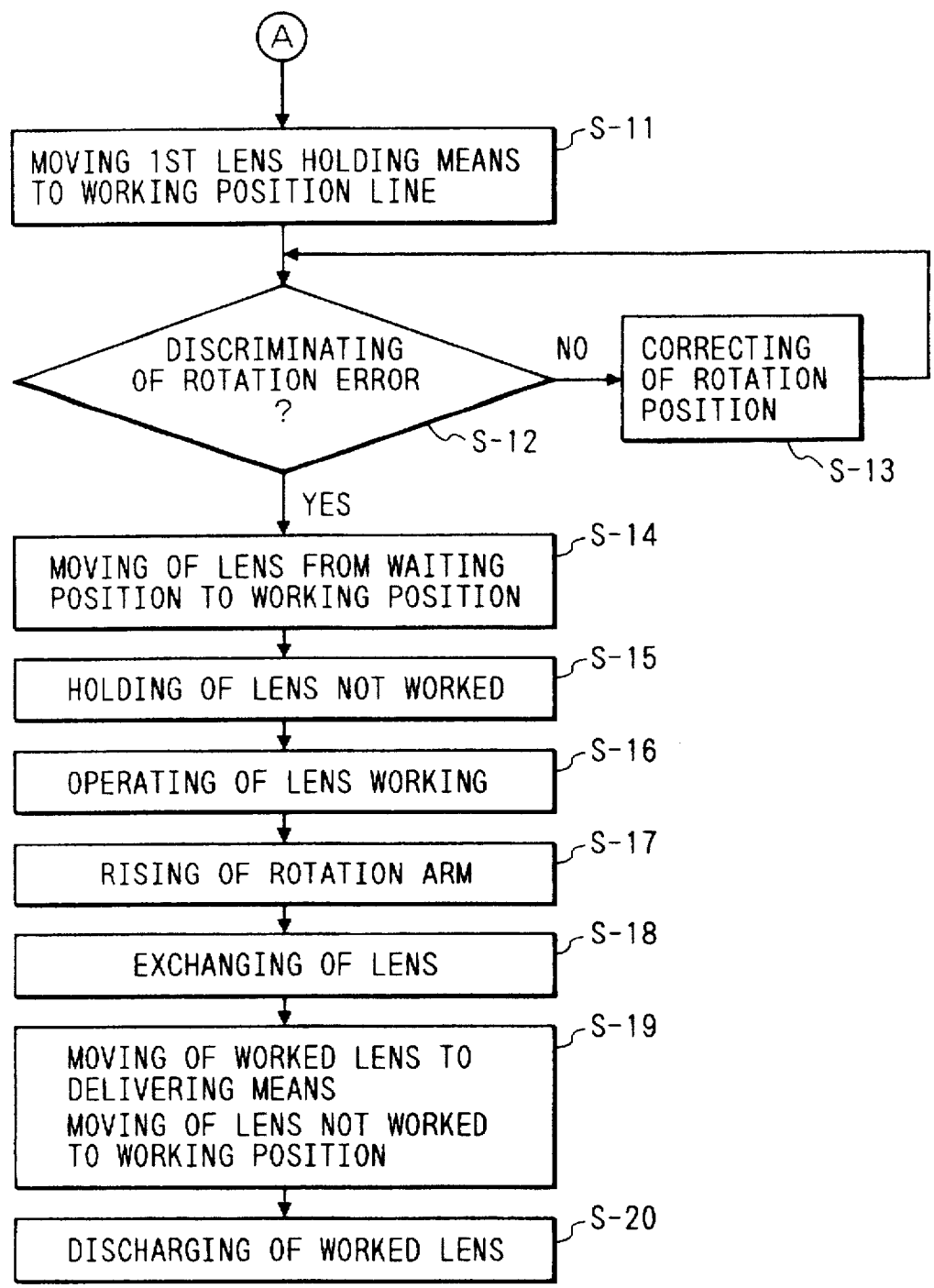

POLISHING/GRINDING METHOD

This application is a continuation-in-part of application Ser. No. 08/209,372, filed Mar. 14, 1994, which is a continuation of application Ser. No. 07/973,758, filed Nov. 9, 1992, now both abandoned.

BACKGROUND OF THE INVENTION

1. Field of the Invention

The present invention relates to polishing or grinding a workpiece having a curved surface such as a lens, a mirror, a ball, or the like.

2. Related Background Art

Japanese Patent Publication No. 63-17587 discloses prior art associated with an automatic lens conveying apparatus in a lens grinding machine. The apparatus disclosed in the Patent Publication includes a lens conveyance positioning mechanism A and a lens supplying/removing mechanism B. The lens conveyance positioning mechanism A comprises: four lens pressurization positioning devices b, b, each consisting of a center shaft 13, a loading table 11, a holder shaft 30, a polishing holder M fitted to the tip of the holder shaft and a spring for pressurizing the polishing holder; and lens polishing devices a, a, a disposed in three positions corresponding to the lens pressurizing positioning devices. The lens supplying/removing mechanism B is disposed in one position which does not correspond to the lens pressurizing positioning device and provided with a work-table 42.

The work table of the lens supplying/removing mechanism B is stepwise pitch-rotated, raised and lowered. The lenses on the work table are conveyed to a pitch rotation position of the lens pressurization positioning device of the lens conveyance positioning mechanism A. The lenses are suction-held by the holder of the lens pressurization locating device and sequentially transferred to the lens conveyance positioning mechanism A. The lens pressurization positioning device is pitch-rotated through every quarter of the circumference. Besides, the lens pressurization positioning device is so moved to ascend and descend in the pitch rotation position. The lenses are sequentially conveyed on the work table as well as on the lens polishing device.

Further, a lens working machine disclosed in Japanese Patent Laid-Open Application No. 57-127662 is constructed of: a rotary grinding stone 7 attached to a tool shaft 11; a working feed table 10 being fed in a direction along a rotation central line of the rotary grinding stone; a work shaft 14 for rotatably supporting the lens to be worked; and an inclination adjusting unit 13 for supporting the work shaft on the working feed table 10 so that the rotation central line of the work shaft and the rotation central line of the grinding stone intersect each other at a predetermined inclined angle. The rotary grinding stone works the lens to have a spherical surface.

The lenses are shifted to the work table from the above-mentioned device, i.e., the lens supplying/removing mechanism B, and the lenses on the work table are sequentially transferred to the lens pressurization positioning mechanism A. In this case, if a delivery in the lens supplying position relative to the working position for polish-working the lens is not accurately effected, a step of adjusting the lens delivering position and an adjusting mechanism are needed.

SUMMARY OF THE INVENTION

It is a first object of the present invention to provide a polishing/grinding method including a supplying method by which a workpiece such as a lens can be accurately transferred from a workpiece conveying position to a workpiece working position.

It is another object of the present invention to provide a supplying method and apparatus capable of accurately performing a pick-up by means for picking up the lens when the workpiece such as a lens is transferred, from a conveying supply path to a working means.

It is still another object of the present invention, in the above-described apparatus arranged such that a lens to be worked is held on a tool shaft; and the central axial line of the lens and the rotation central line of a rotary grinding stone have a predetermined inclined angle, to provide an apparatus capable of precisely performing the pick-up of the lens to be worked from the supply conveying path, the alignment in the pick-up position, the transfer of the pick-up lens to the working means, the working operation by the working means and the discharge of the worked lens after finishing the working operation.

To accomplish the objects given above, according to one aspect of the invention, there is provided a polishing/grinding method in which the workpiece (to be worked) conveyed along a conveying path is aligned with a pick-up means for picking up the workpiece, on the conveying path, and the workpiece is transferred to a working position while maintaining a pick-up position of the pick-up means.

Provided further are a detecting means for detecting an existence and non-existence of the article (workpiece) on the conveying path and means of holding the article in the alignment position. The pick-up position is secured by operating the article holding means in accordance with a signal from the detecting means.

According to another aspect of the invention, there is provided an apparatus having: means for stopping a workpiece conveyed along a conveying path in a predetermined position; means for picking up the workpiece in the stop position; means for polishing or grinding the workpiece; and means for transferring the picked-up workpiece to the working means. According to one mode, the present apparatus includes means for delivering the workpiece stopped on the conveying path to the pick-up means while holding the workpiece in a holding position of the pick-up means.

Further, the working means includes a tool having a curved surface for working the workpiece to have a worked curved surface, and means for adjusting the center of curvature of the worked curved surface of the workpiece and the swinging center of the tool. According to another mode, the working means includes means for swinging the tool about the center of curvature of the workpiece, and adjusting means is provided on the swinging means. Moreover, according to still another mode, the means for holding the workpiece of the pick-up means serves as means for supporting the workpiece in the working means.

The lens defined as the workpiece being conveyed on the conveyor is positioned and stopped in a predetermined stop position. The lens is picked up by the pick-up means in this position. The lens is transferred to a working position of the working means with a rotation of the pick-up means.

BRIEF DESCRIPTION OF THE DRAWINGS

Other objects and advantages of the present invention will become apparent during the following discussion taken in conjunction with the accompanying drawings, in which:

FIGS. 5, 5A, and 5B are is a flowchart showing operating procedures of the present apparatus.

DETAILED DESCRIPTION OF THE PREFERRED EMBODIMENTS

One embodiment of the present invention will hereinafter be described with reference to the drawings.

[Explanation of Construction of Apparatus]

Figure 1:
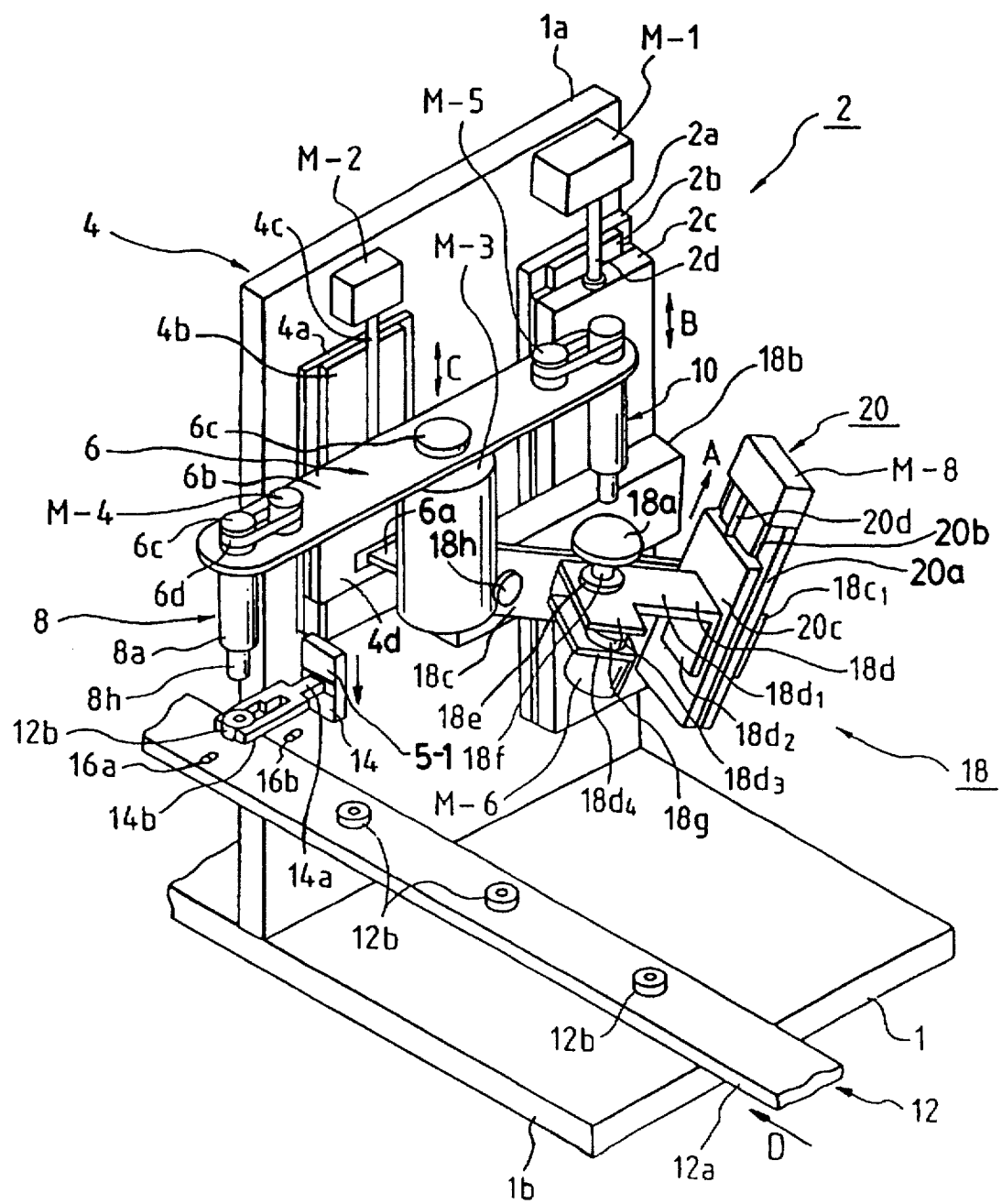
FIG. 1 is a perspective view illustrating the principal portion of an apparatus according to an embodiment of the present invention.

FIG. 1 is a perspective view of the apparatus. The reference numerals in the drawing indicate members constituting this apparatus. Designated by a numeral 1 is a plate-like base consisting of a bottom plate 1b and a vertical plate 1a standing erect from the bottom plate. The numeral 2 denotes a first guide means attached to one surface of the vertical plate 1a. The first guide means 2 serves to shift a working means (polishing means) and a sphere center setting means, which will be mentioned later, in the perpendicular direction along the vertical plate 1a. The guide means 2 comprises a holding plate 2a fixed to the vertical plate 1a, a first guide plate 2b, a first up-and-down slider 2c fixed to the first guide plate 2b, a first motor M-1 mounted on the vertical plate 1a, and a feed shaft screw 2d connected to a rotary shaft of the motor M-1 and fitted in a feed screw hole of the first slider 2c. Control of a moving position of the first slider 2c is effected by controlling the electricity to a motor electrifying circuit in response to a signal of an encoder attached to the motor M-1.

The numeral 4 denotes a second guide means wherein a second slider 4d is moved up and down in an illustrated perpendicular direction C by use of a holding plate 4a fixed to the vertical plate 1a, second guide plate 4b, a second motor M-2 and a feed screw 4c connected to a rotary shaft of the motor M-2. Control of a moving position of the second guide plate 4b is effected by controlling the electricity to a motor electrifying circuit in response to a signal of an encoder attached to the motor M-2.

Designated by a numeral 6 is a rotation transferring means for transferring the workpiece from a conveying supply position to a working position. A holding plate member 6a is perpendicularly fixed to the surface of the second slider 4d. A rotation arm 6b is supported on the holding plate 6a through a shaft (unillustrated) accommodated in a bearing member 6c.

A motor M-3 connected to the shaft described above causes the rotation arm 6b to rotate. A rotation angle of the rotation arm is controlled by switching over the electricity to the motor M-3 in response to a signal of an encoder attached to the motor M-3.

Rotation of arm 6b is initiated by raising second slider 4d by motor M-2 and feed screw 4c such that the rotational arm 6b is lifted upwardly above the vertical plate 1a. In the raised position the lens holding means 8 and 10 can clear the vertical plate 1a. At this point, motor M-3 can be actuated to rotate arm 6b through 180° (or more). When the rotational arm 6b is positioned, motor M-2 reverses rotation of the feed screw 4c to lower the rotational arm back to the waiting position.

Secured to both ends of the rotation arm 6b are a first lens holding means 8 for suction-holding an unworked article and a second lens holding means 10 for suction-holding a worked article worked by a working means 18a which will be stated hereinbelow.

The lens holding means will be described.

Figure 2:
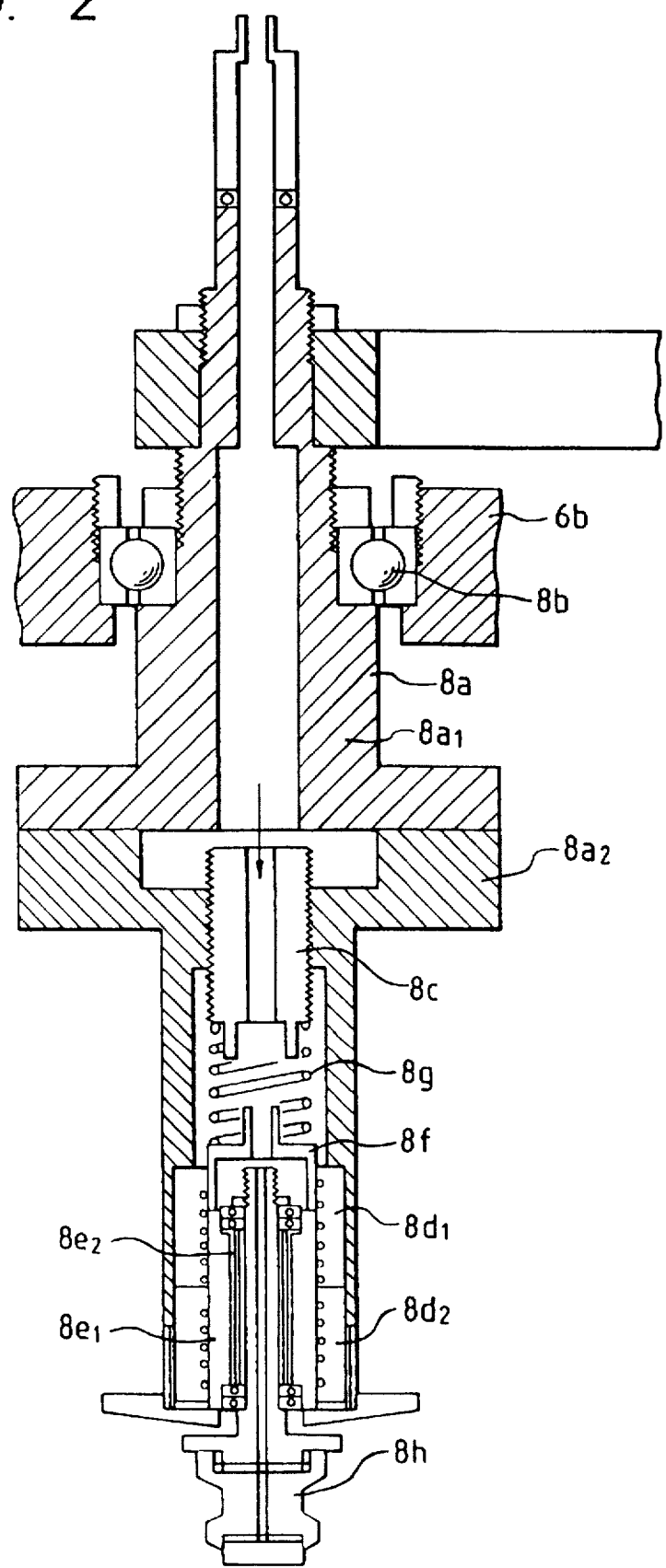
FIG. 2 is a sectional view depicting the principal portion of a lens holding means employed in the present apparatus.

FIG. 2 is a sectional view depicting the principal portions of the lens holding means 8, 10.

A hollowed rotary body 8a is fitted to the rotation arm 6b through a bearing member 8b. The rotary body 8a consists of an upper subbody $8a_1$ and a lower subbody $8a_2$. A hollowed screw shaft 8c is screwed in a hollowed inner diameter portion of the lower rotary subbody $8a_2$. The inner diameter portion of the hollowed portion of the lower rotary subbody $8a_2$ has an inner diameter difference. Ball bushes $8d_1$, $8d_2$ are fitted in the inner diameter portion of lower end part thereof. First and second collars $8e_1$, $8e_2$ are fitted in interiors of the ball bushes.

A hollowed cylindrical body 8f is fitted in an upper end part of the first collar $8e_1$. A spring member 8g is stretched between an upper part of the hollowed cylindrical body 8f and the screw shaft 8c.

Bearing members are provided at the upper and lower end parts of the second collar $8e_2$. A driven rotary body 8h is fitted in the bearing members. A lower part of the driven rotary body 8h is formed with a lens suction holding means.

The first lens holding means 8 comprises a motor M-4, a pulley 6c rotatably supported by the rotation arm 6b, a belt 6d and a holding mechanism shown in FIG. 2 which is connected to the pulley 6c and rotatably supported by the rotation arm 6b.

The second lens holding means 10 has the same construction as that of the first lens holding means 8.

Referring to FIG. 1, the numeral 12 denotes a means for conveying and supplying the unworked article, and 12a indicates a belt conveyor. Pallets 12b are placed at a predetermined interval on the conveyor 12a. Unworked lenses are housed in the pallets.

Designated by a numeral 14 is a lens delivering means having functions to deliver the unworked lens supplied from the conveying/supplying means 12 to the first lens holding means 8 and deliver the worked lens received from the second lens holding means 10 to the conveying/supplying means 12. The lens delivering means 14 comprises a first cylinder S-1 fixed to the vertical plate 1a, a moving member 14a connected to a piston of the cylinder S-1 and chuck members 14b secured to the moving member 14a. A chuck member 14b consisting of a pair of element is driven to open and close by an unillustrated motor (M-10), thus retaining the pallet on the conveyor.

The numeral 16 denotes an article detecting means comprising a light emitting element 16a for emitting the light, a light receiving element 16b for receiving the light from the light emitter 16a and a signal generator 16c (FIG. 4) for outputting an existence or non-existence of the light received by the light receiver.

A lighting position of the luminescence by the detecting means is set so that the light passes through the center of a lens delivering position by the lens delivering means 14.

Designated by a numeral 18 is a swinging means for swinging a polishing tool 18a along a swinging shaft (rotary shaft of a swinging motor that will hereafter be explained). The swinging means includes a holder plate 18b fixed to the first slider 2c and a swinging arm 18c rotatably supported on one end of the holder plate 18b. The other end of the swinging arm 18c is defined as a free end, and the top end thereof is bent in an L-like shape. A sphere center setting means 20 that will be mentioned later is fitted to the bent part $18c_1$.

A holding plate 18d fixed onto a slide member of the sphere center setting means is formed with a tabular part 18$d_1$, a fixed part 18$d_2$ bent from the other end of the tabular part and fixed to the slide member, a bent part 18$d_3$, bent from the other end of the tabular part 18$d_1$, for holding the tool part, and a bent part 18$d_4$ bent in parallel with the bent part 18$d_3$.

The bent part 18$d_3$ is provided with a shaft 18f supported by a bearing member 18e. A semi-spherical surface tool 18a is fixed to the tip of the shaft 18f.

A motor M-6 for rotating the tool is mounted on the lower surface of the bent part 18$d_4$. A rotary shaft of the motor M-6 penetrates a through-hole formed in the bent part 18$d_4$. The tip of this rotary shaft is fitted with a pulley (not shown) mounted on the upper surface of the bent part 18$d_3$. A timing belt 18g is stretched between this pulley and a pulley (not shown) attached to the shaft of the semi-spherical surface tool 18a, thereby transferring rotation of the motor M-6 to the semi-spherical surface tool 18a.

The swinging arm 18c is connected to a rotary shaft of a swinging motor M-7 attached to the rear face of the holder plate 18b and is axially supported by a bearing member 20a, whereby the arm makes reciprocative swing motion about the shaft of the swinging motor M-7.

The swinging motion of the swinging arm is performed based on a switchover of the electricity to the motor when an unillustrated encoder attached to the motor M-7 detects a rotating position of the motor. Further, a swinging angle is switched over by changing the signal of the encoder.

The numeral 20 denotes a sphere center setting means. This setting means comprises a holding plate member 20a fixed to the bent part of the swinging arm 18, a guide member 20b mounted on the holding plate 20a, a sphere center setting member 20c fitted with the holding plate 18d, a motor M-8 for moving the sphere center setting member 20c, and a ball screw member 20d, connected to the rotary shaft of the motor, for moving the sphere center setting member 20c in an arrowed direction A.

An operation to set the sphere center will be explained.

The sphere center setting implies that a curvature center of the semi-spherical surface tool 18a coincides with a point of intersection between a rotary axial line of the rotary support member (shaft member 18f in FIG. 1) of the tool and an axial line of the swinging shaft of the swinging motor M-7.

Figure 3:
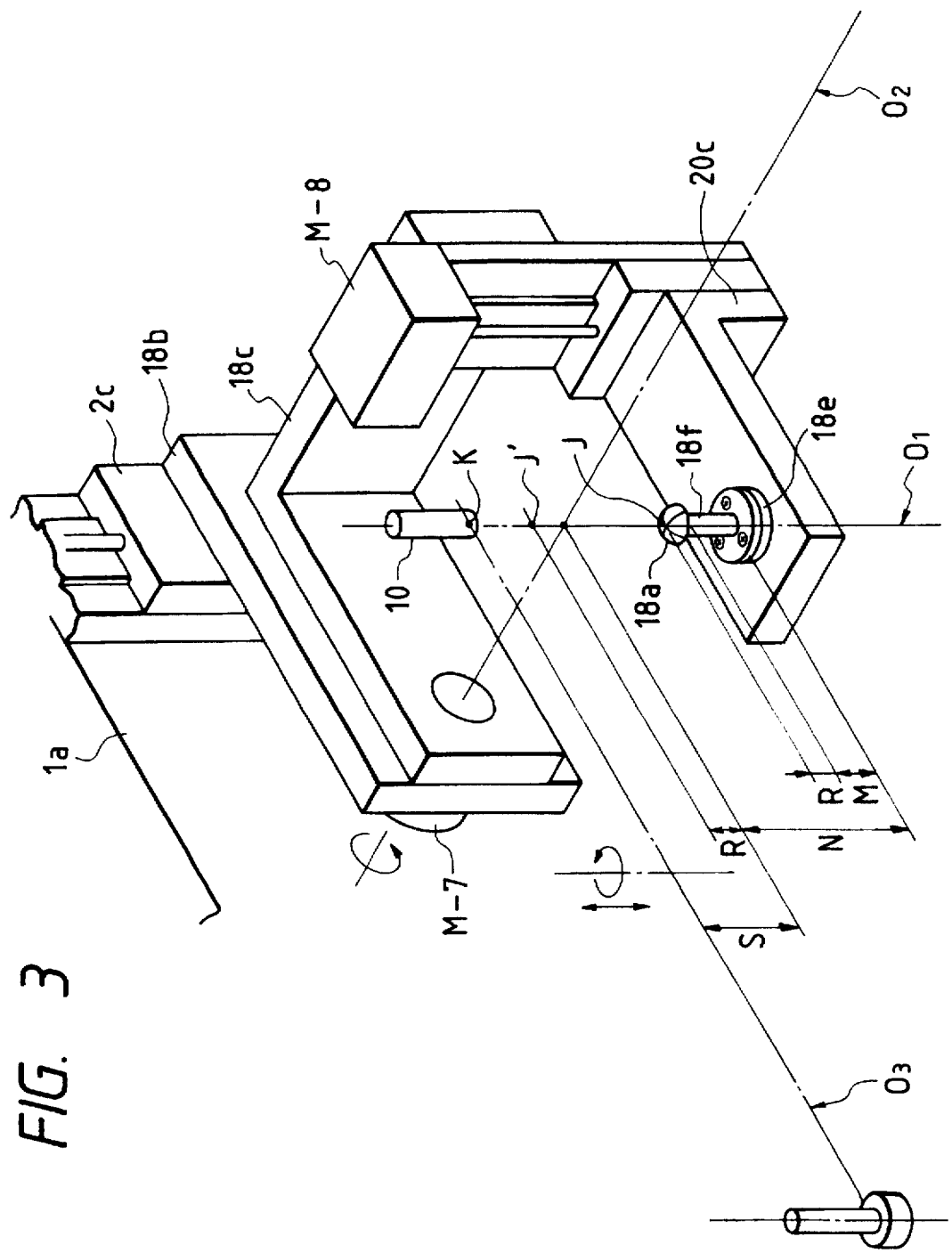
FIG. 3 is a view explaining an operation of setting a sphere center by a sphere center setting means of the present apparatus.

FIG. 3 is a schematic diagram of assistance in explaining the sphere center setting operation. In FIG. 3, the same numerals as those of FIG. 1, indicate the same members. Referring to FIG. 3, the swinging arm 18c is set in a position parallel with the holder plate 18b. In FIG. 3, the symbol $O_1$ indicates a line for connecting the axial line of the driven rotary body of the second lens holding means to the axial line of the tool. The symbol $O_2$ represents an axial line of the rotary shaft of the swinging motor, and $O_3$ denotes a line showing a position in which the lens is held by the lens holding means 8, 10 and then worked. The symbol R represents a radius of curvature of the semi-spherical surface tool 18a; S a distance between the swinging axial line $O_2$ and the working position line $O_3$; M a dimension of axial length from the central point of curvature of the semi-spherical surface tool up to the mounting position; and N a distance from the mounting position of the bearing member 18e up to the swinging axial line $O_2$. The dimensions thereof are obtainable in terms of design.

Next, the procedures of setting the sphere center will be described.

(a) Obtained beforehand are the dimension of R+M and the height dimensions N, S.

(b) A motor M-8 for setting the sphere center is driven to move the sphere center setting member 20c along the guide plate up to a position of a value given by:

$$N-(R+M)+R=N-M \quad (1)$$

In this state, the central point of curvature of the semi-spherical surface tool 18a coincides with the swinging axial line $O_2$. A vertex J of the semi-spherical surface tool 18a shifts to a position J'.

(c) Next, the motor M-8 is driven so that the vertex J' of the tool 18a coincides with the working position line $O_3$.

(d) The motor M-1 of the first guide means is driven to move the holder plate 18b by a value given by:

$$(S-R) \quad (2)$$

The sphere center setting is effected by the above-described operations (a) to (d).

Figure 4:
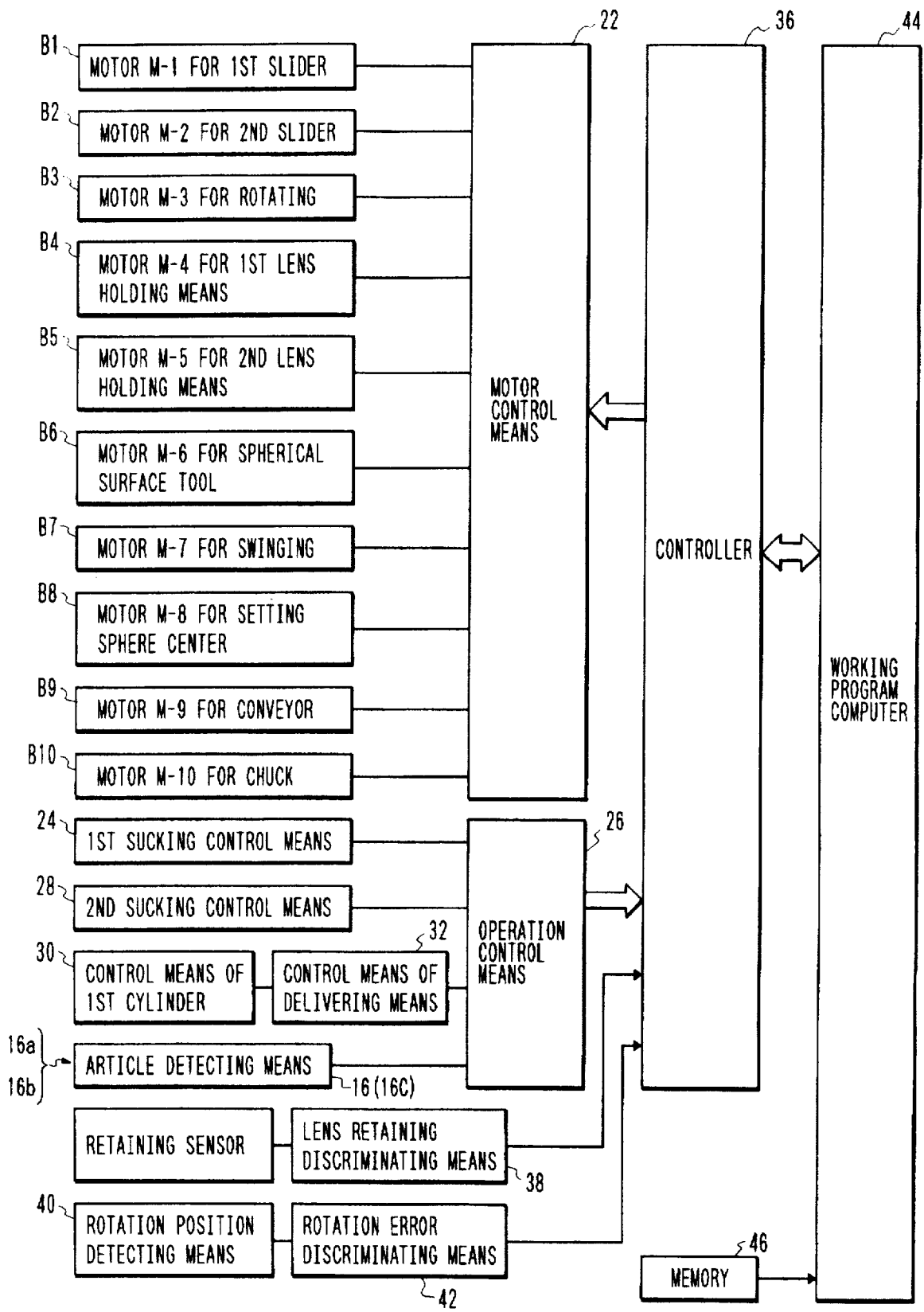
FIG. 4 is a block diagram showing control of the present apparatus.

FIG. 4 is a block diagram showing the control of the present apparatus.

The symbol B1 designates an electrifying circuit of the motor M-1 for the first slider; B2 an electrifying circuit of the motor M-2 for the second slider; B3 an electrifying circuit of the motor M-3 for rotations; B4 an electrifying circuit of the motor M-4 of the first lens holding means; B5 an electrifying circuit of the motor M-5 of the second lens holding means; B6 an electrifying circuit of the rotation motor M-6 of the semi-spherical surface tool 18a; B7 an electrifying circuit of the swinging motor M-7; B8 an electrifying circuit of the motor M-8 for setting the sphere center; B9 an electrifying circuit of the motor M-9 for driving the conveyor for conveyance; and B10 an electrifying circuit of the motor for chucking of the delivering means. The electrifying circuits described above are respectively connected to the motor control means 22. Electrifying directions and periods of the respective motors are controlled by signals transmitted from the control means 22.

Designated by a numeral 24 is a suction control means of a sucking means connected to the tip of the driven rotary body of the first lens holding means 8. The suction control means 24 comprising a pump and a pump control unit effects a sucking operation in response to a signal from an operation control means 26. The numeral 28 denotes a suction control means, of the second lens holding means, having the same construction as that of the control means 24.

A control means 30 of a cylinder S-1 of the delivering means is connected to a control means 32 for controlling the delivering means. The control means 32 connected to the operation control means 26 transfers and receives the control signals. An article detecting means 16 connected to the operation control means 26 outputs, upon detecting a signal from the light receiving element 16a of the article detecting means 16, a signal indicating an existence or non-existence of the article. A controller 36 for controlling the present apparatus as a whole is connected to the motor control means 22 and the operation control means 26. A means 38 discriminates whether the lens holding means retains the lens or not. The means 38 outputs a discrimination signal to the controller 36 on the basis of the signals of the first and second sucking means.

The following is an explanation of the operations of the apparatus.

The operation of the present apparatus will be described with reference to a flowchart of FIG. 5.

(Step S-1: the "step" will be omitted and expressed such as S-1.)

A curvature of the lens that will be hereafter worked and a sphere center of the semi-spherical surface tool have already been completely set in the initial state. It is therefore assumed that no lens exists on the tool 18a.

(S-2) An electrifying signal is inputted to the circuit B9 of the motor for driving the conveyor 12a, thereby moving the conveyor 12a. The pallets on the conveyor are fed in an arrowed direction D in FIG. 1.

(S-3) When the pallet 12b moves to the lighting line of the luminescence by the article detecting means, a signal is outputted from the detecting means 16 and transmitted via the operation control means 26 to the controller 36.

(S-4) The controller 36 stops the electricity to the conveyor motor M-9 through the motor control means 22 upon receiving the signal described above, thereby stopping the conveyor.

(S-5) The control means 30 of the cylinder S-1 operates under the control means for the delivering means 14 in response to the electricity stop signal of the motor M-9. The chuck member 14b is moved to a position of the conveyor 12a. The chuck member 14b effects a pick-up.

(S-6) The chuck member 14b is provided with an unillustrated article retaining sensor and discriminate whether the lens is retained or not in accordance with a signal of this sensor.

(S-7) The cylinder S-1 is operated by the signal of the sensor, thereby moving the delivering means 14 to a waiting position of the first lens holding means. The waiting position of the first lens holding means is set more upwards than the working position line $O_3$ of FIG. 3. A lens retaining signal associated with the sensor described above is transmitted to the controller 36.

(S-8) The delivering means moves to the waiting position, then the lens on the pallet of the delivering means is held by the first lens sucking means to the suction holding portion of the driven rotary body 8h.

(S-9) The first lens sucking means includes a suction detecting means for outputting a suction completing signal when the lens is sucked. This detection signal is inputted to the controller.

(S-10) The controller 36, on receiving the detection signal, causes the rotation arm 6b to rotate as discussed above by electrifying the rotation motor M-3 through the motor control means 22. The rotating operation is performed in such a manner that the rotation arm 6b is rotated through 180 degrees, and the first lens holding means 8 is rotated at the waiting position.

(S-11) The rotating operation is controlled by the signal of the encoder connected to the motor M-3. The signal from this encoder is transmitted to the controller 36. The motor M-2 of the second guide means 4 is operated by this signal, and the first lens holding means of the rotation arm is moved to the working position line $O_3$. The lens held by the first lens holding means is thereby moved onto the rotary axial line $O_1$ of the semi-spherical surface tool shown in FIG. 3.

(S-12) In the rotating operation of the rotation arm in step S-11, there is accurately adjusted the sphere center setting operation by the respective means such as the swinging means (the motor M-7, the swinging arm 18c) and the sphere center setting means (the sphere center setting plate 20c, etc.). Hence, the position of the rotation arm in step S-11 has to be accurately controlled. For this purpose, the positional signal of the rotation shaft of the rotation motor M-3 is detected by a rotation position detecting means 40. A rotation error discriminating means 42 makes a discrimination.

(S-13) If within an allowable range as a result of the discrimination by the rotation error discriminating means 42, the operation proceeds to the next step. If the rotation error exceeds the allowable range as a result of the discrimination, the error information is inputted to the motor control means 22, thereby correcting the rotation position.

(S-14) When the rotation position of the rotation arm is determined, the lens which is suction-held by the tip of the driven rotary body of the first lens holding means is next lowered down to the position of the working position line $O_3$ shown in FIG. 3 from the waiting position. This operation is performed by driving the slider motor M-1 on the basis of the signal of the rotation error discriminating means or the signal of the positional correction information. Note that during the descent of the sucked lens in step S-14, the lens contacts the vertex of the semi-spherical surface tool 18a when the lens is lowered down to the point J' above the point of intersection between the swinging axial line $O_2$ and the rotary axial line $O_1$ of the tool in FIG. 3. The lens undergoes a pressure caused by the descents of the lens holding means and the semi-spherical surface tool. In the present apparatus, the lens holding means incorporates a pressure adjusting mechanism. Referring to FIG. 2, a pressure of the spring member 8g is adjustable by rotationally operating the hollowed screw member 8c screwed in the hollowed part of the lower rotary subbody $8a_2$.

(S-15) The second lens holding means holds the unworked lens by suction in parallel while synchronizing with the movement of the lens from the waiting position to the working position in step S-14. More specifically, the conveyor 12a is driven in matching with the timing of the rotating operation in step S-10, and the next pallet is conveyed. The delivering means 14 effects the pick-up. The lens is suction-held in accordance with the descent of the first lens holding means.

(S-16) When finishing the movement of the lens to the descent position, the working operation is started. In advance of working, a working liquid is supplied. The working operation involves: inputting, to a memory 46 for a working program 44, the information on a lens material, a lens configuration, a working quantity and a performance of the working tool; setting the number of revolutions of the semi-spherical surface tool 18a, a swinging angle and swinging speed of the tool; and setting the number of revolutions of the motor M-4 for rotating the rotary body 8a of the lens holding means and also a working period on the basis of the information. The information for this working is transferred from the working program 44 to the controller 36. The information is then transferred as control signals from the controller to the respective control means.

(S-17) When the predetermined working is finished in step S-16, the individual motors stop. A second slider driving signal is inputted via the motor control means 22 to the motor M-2 in response to the end signal from the working program. The rotation arm 6b is thereby raised from the working position to the waiting position.

(S-18) Subsequently, after confirming the ascent to the waiting position, the rotation motor M-3 performs the rotating motions, whereby the position of the worked lens is replaced with the position of the unworked lens. When the lens moves to the working position of the unworked lens, the lens positions in steps S-12 and S-13 are adjusted.

(S-19) The worked lens held by the first lens holding means is discharged to the delivering means 14 while associated with the descent motion of the unworked lens suction-held by the second lens holding means from the waiting position to the working position.

(S-20) The unworked lens is worked, and in the meantime the worked lens is discharged onto the pallet on the conveyor 12a from the delivering means. Thereafter, the steps described above are repeatedly executed.

The present invention is constructed as discussed above and therefore exhibits the following advantages.

Even when the working curvature varies, there is no necessity for adjusting the working position of the holder because of no change in the position of the working point. Further, the height of the semi-spherical surface tool is constant, thus the rigidity of the semi-spherical surface tool can be stably strengthened at a high level.

Provided further is the means for accurately delivering the lens between the unworked lens conveying/supplying means and the lens pick-up means. Accordingly, the holding posture of the lens can be accurately maintained. It is therefore possible to prevent a mistake due to a defect of the lens posture. Particularly, the delivering operation of the lens delivering means is performed by adding the function to detect the lens position, thereby securing the positional accuracy. Moreover, according to the present invention, the holding and transferring of the unworked and worked lens and also working operation are executed by the rotation means during the same period, thereby improving the productivity. Furthermore, it is feasible to provide the apparatus capable of accurately setting the sphere center by adopting such a construction that the swinging means and the sphere center setting means are attached to the holder plate 18b raised and lowered by the slide means. Moreover, the present invention incorporates the function to discriminate whether the rotating position is correct or wrong during a movement of the unworked lens to the working position with the rotating motion of the rotation means. The working accuracy can be thereby ameliorated.

Although the illustrative embodiment of the present invention has been described in detail with reference to the accompanying drawings, it is to be understood that the present invention is not limited to the embodiment discussed above. Various changes or modification may be effected by one skilled in the art without departing from the scope or spirit of the invention.

What is claimed is:

1. A method of working a workpiece with an apparatus, the apparatus including:

a tool for polishing and/or grinding the workpiece and having a tool rotation axis line;

means for swingably rotating the tool for working the workpiece and being supported on a base plate and having a swingable rotation axis line;

rotational means for receiving the workpiece from conveying means for supplying the workpiece and putting the workpiece on the tool, and having a rotational axis line; and holding means for holding the workpiece, the holding means having a vertical axis and being mounted on the rotational means, said method comprising the steps of:

holding the workpiece by the holding means;

rotating the held workpiece by the rotational means in a direction of the tool to match the rotational axis line of the workpiece with the rotation axis line of the tool;

matching the vertical axis of the holding means holding the workpiece with an intersection of the swingable rotation axis line and the tool rotation axis line; and holding the workpiece above the tool and working the workpiece by exerting work pressure on the workpiece.

* * * * *

UNITED STATES PATENT AND TRADEMARK OFFICE
CERTIFICATE OF CORRECTION

PATENT NO. : 5,791,972

DATED : August 11, 1998

INVENTOR(S) : Murasugi et al.

It is certified that error appears in the above-identified patent and that said Letters Patent is hereby corrected as shown below:

COLUMN 3:

Line 8, "are is" should read --are-- and "a flowchart" should read --flowcharts--.

COLUMN 5:

Line 21, "member 20a," should read --member 18h,--.

COLUMN 7:

Line 50, "position." should read --position line.--

Signed and Sealed this

Twenty-second Day of June, 1999

Attest:

Attesting Officer

Q. TODD DICKINSON

Acting Commissioner of Patents and Trademarks